(12) United States Patent
Nakano et al.

(10) Patent No.: US 6,980,616 B1
(45) Date of Patent: Dec. 27, 2005

(54) TRANSMISSION METHOD AND DEVICE

(75) Inventors: Daisuke Nakano, Tenri (JP); Takashi Nishimura, Tenri (JP); Yuji Ichikawa, Tenri (JP); Masafumi Takahashi, Tenri (JP); Kazuyuki Sumi, Nara (JP); Toru Ueda, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/889,155

(22) PCT Filed: Jan. 17, 2000

(86) PCT No.: PCT/JP00/00167

§ 371 (c)(1),
(2), (4) Date: Jul. 11, 2001

(87) PCT Pub. No.: WO00/44126

PCT Pub. Date: Jul. 27, 2000

(30) Foreign Application Priority Data

| Jan. 19, 1999 | (JP) | ................................. 11-010038 |
| Nov. 19, 1999 | (JP) | ................................. 11-329183 |

(51) Int. Cl.[7] ........................... H04L 7/06; H04B 7/212
(52) U.S. Cl. ...................... 375/364; 375/365; 375/363; 370/342; 370/343
(58) Field of Search .............................. 375/372, 371, 375/365, 240, 364; 370/342, 343; 455/63.1, 455/453

(56) References Cited

U.S. PATENT DOCUMENTS

| 5,189,671 A | * | 2/1993 | Cheng ......................... 370/471 |
| 5,887,039 A | * | 3/1999 | Suemura et al. ............. 375/365 |
| 6,038,234 A | * | 3/2000 | LaFollette et al. .......... 370/443 |
| 6,147,963 A | * | 11/2000 | Walker et al. ............... 370/200 |
| 6,356,558 B1 | * | 3/2002 | Hauck et al. ................ 370/450 |

FOREIGN PATENT DOCUMENTS

| EP | A1 206409 | 12/1986 |
| EP | A2 923035 | 6/1999 |
| JP | A 63-109612 | 5/1988 |
| JP | A 1-218247 | 8/1989 |
| JP | A 4-000826 | 1/1992 |
| JP | A 4-002234 | 1/1992 |
| JP | A 5-056024 | 3/1993 |
| JP | A 9-036823 | 2/1997 |
| JP | A 0 9098200 | 4/1997 |

* cited by examiner

Primary Examiner—Jay K. Patel
Assistant Examiner—Qutub Ghulamali
(74) Attorney, Agent, or Firm—Birch, Stewart, Kolasch & Birch, LLP

(57) ABSTRACT

A transmission method uses multiple kinds of control codes to be exchanged on a serial transmission path between a sender side and a receiver side, and each of the multiple kinds of control codes has bits smaller in number than a predetermined fixed length. The transmission method includes the steps of inspecting the received bit string in groups of bits of the number of the control code, and thereby determining whether one of the multiple kinds of control codes is present in the serial signal received on the serial transmission path or not, selecting the control code to be sent based on a result of the determination in the determining step, sending, onto the serial transmission path, a bit string containing at least the control code to be sent based on the result of the determination in the determining step, and receiving the data code by inspecting the received bit string in groups of bits of the fixed length in response to the detection of the control code indicating the start of transmission of the data from the opposite side in the determining step.

17 Claims, 13 Drawing Sheets

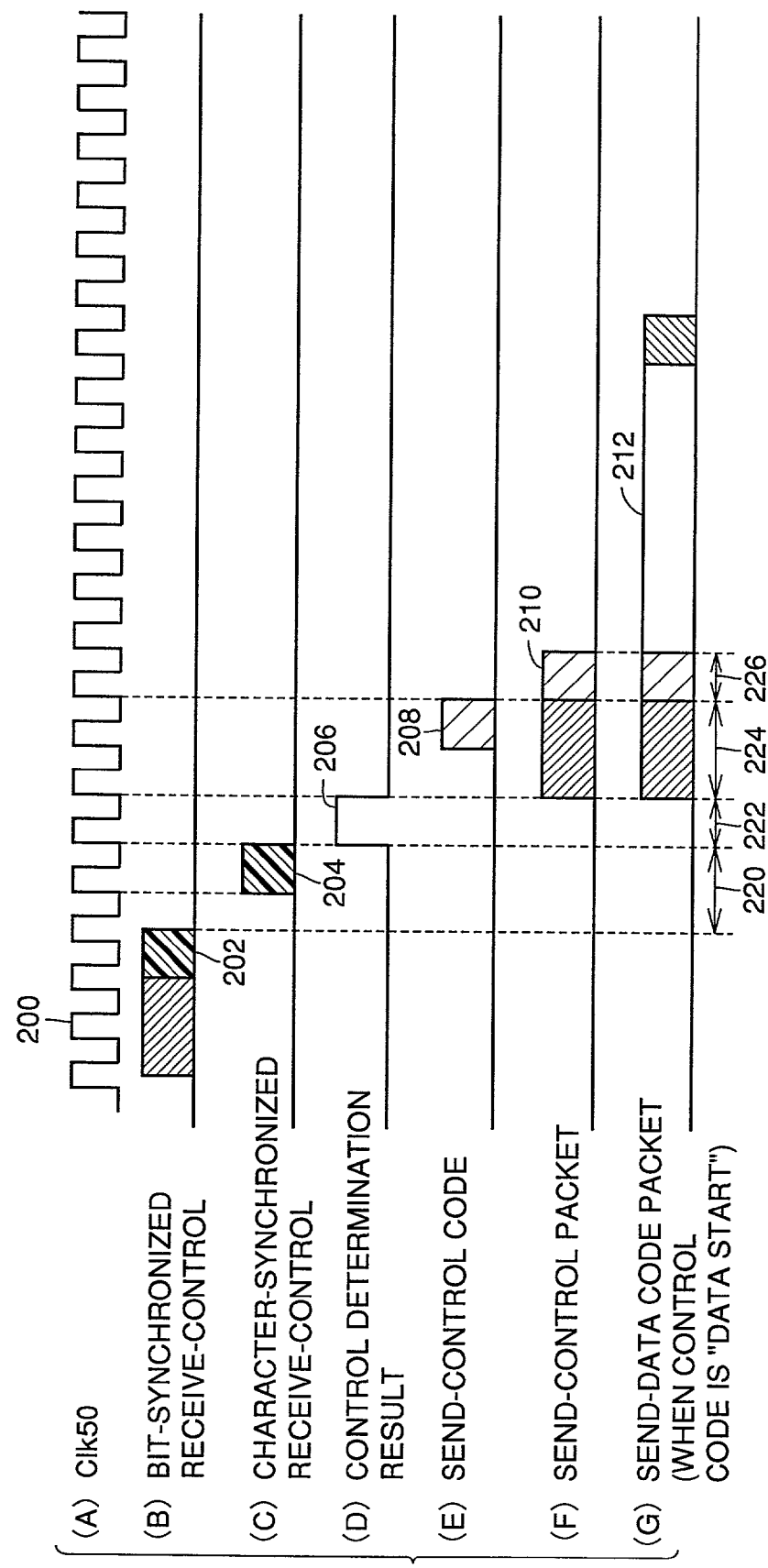

FIG.11

PING-PONG REACTION DELAY TIME (UNIT: BITS) AFTER RECEPTION OF CONTROL CODE PACKET

| | PRIOR ART | INVENTION | REMARKS |
|---|---|---|---|
| BIT SYNCHRONIZATION | <1 BIT | <1 BIT | SHIFT FROM INTERNAL CLOCK |
| CHARACTER SYNCHRONIZATION (A) | 0~9 BITS +10 BITS (220) | 0~4 BITS +5 BITS (611) | SHIFT FROM INTERNAL CLOCK + CONTROL CODE LENGTH |
| CONTROL CODE DETERMINATION (CONTROL PORTION) (B) | 10 BITS (222) | 5 BITS (612) | ONE (SLOWER) INTERNAL CLOCK |
| HEADER PRODUCTION (PACKET PRODUCTION) | 10 BITS (224) | 10 BITS (613) | HEADER LENGTH |
| CONTROL CODE ADDITION (PACKET PRODUCTION) (A) | 10 BITS (226) | 5 BITS (614) | CONTROL CODE LENGTH |
| TOTAL DELAY TIME | 35+(0~10) BITS | 35+(0~5) BITS | |

TRANSMISSION METHOD AND DEVICE

This application is the national phase under 35 U.S.C. § 371 of PCT International Application No. PCT/JP00/00167 which has an International filing date of Jan. 17, 2000, which designated the United States of America and was not published in English.

TECHNICAL FIELD

The present invention relates to a transmission method and a device used in fast serial communication, and particularly relates to a transmission method and a device, in which transmission of data codes are controlled by transmission of control codes.

BACKGROUND ART

Fast serial buses defined in world standards IEEE 1394-1995 are employed for fast transfer of a large amount of data between computers, digital cameras, digital video cameras and other various home electrical devices. According to IEEE 1394-1995, data is transmitted bidirectionally over four electrical signal lines formed of two twisted-pairs.

In the p1394b conference, transmission methods using two optical fibers have been discussed.

In this method, arbitration of a token or transmission right is performed by exchanging control signals between devices in a mode that is, although not completely a full-duplex, but considered to be a pseudo full-duplex, and the data transfer is performed in a half-duplex mode using the token thus arbitrated. For example, according to IEEE 1394-1995, high and low signals are transmitted from the both devices using all the four signal lines, and the transmission right is arbitrated based on combinations of resultant potentials appearing on the signal lines.

A system for transmitting a signal of IEEE 1394 through a single optical fiber has been developed. If a single optical fiber is used in the full-duplex mode, the communication will be difficult because of the large interference, jitter and others in the transmitted signals and therefore, it is necessary to use media, that do not diffuse the light. In the case of the full-duplex mode, a photodiode which is a light receiver is located near an LED (Laser Emitting Diode) which is a source of light so that reflection of light by a coupler or the like may adversely affect a light receiving performance of the photodiode. Further, due to the full-duplexing, both the reflection on the one side and the reflection on the opposite side occur in the same medium, which complicates the processing. For these problems, a large cost is required for achieving the full-duplexing using only one optical fiber. In the case of using only one optical fiber, it is preferable to employ the half-duplexing, in which the two sides alternately perform the transmission.

A ping-pong transmission system (officially, "Time Compression Multiplexing system") is one of such systems. According to the ping-pong transmission system, sending and receiving of a predetermined amount of data are repeated in a predetermined cycle, which will be referred to as a "ping-pong cycle" hereinafter.

According to IEEE 1394, exchange of control signals is performed in addition to data transfer. Since the control signal reflects the states of both the sides per participating in the communication, it is necessary to perform the exchange as quickly as possible. Meanwhile, it is necessary to send as large an amount of the data as possible at a time for sending the data as fast as possible. Therefore, it is preferable to continue each transfer operation for a long period so that data can be continuously transferred in one direction during the data transfer period, and it is also preferable to reduce a transfer period other than the data transfer so that control signals may be exchanged fast. Thus, there has been devised and used an improved ping-pong transmission system that switches the operation between the short fixed length transmission, which requires a short period per operation, and the variable length transmission, which allows increase in transfer period per operation, if necessary. In this specification, this method is called a "variable-burst-length ping-pong transmission system".

In the transmission system using the optical fiber, only the send-code is sent in one direction at a time, and the clock signal is not sent. On the receiver side, it is necessary to recover the clock from the received code. For recovering the clock, it is not preferable if a continuation of "1" or "0" larger than a certain length is present in the send-code. This is because recovery of the clock signal needs transitions in signal level of the received code occurring with a certain frequency. In general, therefore, encoding is performed by superimposing a clock on the send-code so that the transitions in signal level will occur with a certain frequency.

A system called "4B5B" and a system called "8B10B" have been known in the art of superimposing the clock on the send-code. In the 4B5B encoding system, four bits of the send-data are encoded into five bits. In the system called 8B10B, eight bits of the send-data are encoded into 10 bits. In the encoded send-code, transitions in signal level will occur with a certain frequency so that the clock signal can be recovered on the receiver side.

According to p1394b, the 8B10B encoding system described above is employed. Send data is sent as a packet, and a header of a fixed length is added to the leading end thereof for indicating that a packet proper follows. A bit pattern of the header is a specific bit string called a "synchronous pattern". By detecting this specific bit string on the receiver side, it is possible to know that the packet proper follows, and it is also possible to recover a clock signal based on this specific bit string, and thereafter to use the clock signal thus recovered for receiving the code. If this encoding system is applied to the ping-pong transmission system of a variable burst length described above, a portion of the packet except for the header is formed of a set of codes, each of which is formed of 10 bits, which is the shortest code length.

In the ping-pong transmission system of the variable burst length type, it is necessary to determine whether the packet has a fixed length or a variable length. In a typical method for this determination, a bit for determination is arranged at the header of the packet. However, if only the control codes are transmitted with a fixed length, and if the data codes are always transmitted with a variable length, as in the ping-pong transmission system of the variable burst length type, i.e., if only a relatively few kinds of codes are transmitted with a fixed length, a special code may be defined for indicating that a variable length packet follows, it is possible to determine whether the packet has a fixed length or a variable length. An example of such a packet format is shown in FIG. 2.

Referring to FIG. 2(A), a data code packet 500 includes a header 502 having a specific bit string as described before, a data start code 504 of 10 bits indicating that data follows, data 516 which is a data proper to be sent, and a data end code 514 of 10 bits indicating the end of data. Data 516 includes one or more data codes 506, 508, . . . and 512 each formed of 10 bits.

Referring to FIG. 2(B), a control code packet 530 includes a header 532, which is the same as header 502, and a control code 534 of 10 bits.

When data code packet 500 is to be transmitted, data start code 504 is inserted immediately after header 502 and before data 516, and data end code 514 is added immediately after data 516. When equipment on a receiver side receives data start code 504, it expects coming of data 516, and performs decoding of the data and other processing. When data end code 514 is received during data reception, the equipment on the receiver side knows the end of data code packet 500, and changes the modes in order to receive control code packet 530 of a normal fixed length.

In the conventional method, therefore, the packet is handled as a variable length packet only when the leading 10 bits of the packet immediately after the header 502 is the data start code.

Particularly, according to IEEE 1394, a DATA_PREFIX code is attached before the data, and a DATA_PREFIX code or a DATA_END code is appended after the data. Therefore, the above system is suitable for IEEE 1394.

Referring to FIG. 1, description will now be given on a conventional device, which uses the packet structure shown in FIG. 2, and achieves the ping-pong transmission for transmitting the data code encoded in the 8B10B encoding method as well as the control code of 10 bits.

Referring to FIG. 1, a conventional transmitting device 400 has two kinds of internal clock signals, and more specifically has a fast clock signal CLK250 having a frequency, e.g., of 250 MHz for handling serial data and a clock signal CLK25, which has a frequency 25 MHz and a period ten times larger than that of clock signal CLK250, for handling parallel data of 10 bits.

Transmitting device 400 includes: an optical fiber interface 102 connected to a transmission path 101, which is formed of one optical fiber and is connected to equipment on the opposite side; a bit synchronizing circuit 103 connected to optical fiber interface 102 for outputting the signal received from transmission path 101 via optical fiber interface 102, in synchronization with clock signal CLK250; a character synchronizing circuit 404 for receiving the output of bit synchronizing circuit 103 and clock signal CLK25, finding header 502 in the bit string output from bit synchronizing circuit 103, preparing characters each formed of 10 bits from the bit string following header 502, and outputting the characters thus prepared in synchronization with internal clock signal CLK25; an 8B10B decoder 109 for receiving the output of character synchronizing circuit 404 and clock signal CLK25, decoding the characters encoded in the 8B10B encoding method, and restoring the original data from the sent code for outputting the same; and an internal interface 113 (i.e., an interface for internal circuits of the equipment) for internally applying data received from 8B10B decoder 109, and applying data to be externally output from the equipment and the internal state of the equipment to transmitting device 400. Note that the "equipment" here indicates an upper layer(s) in a layer structure of communication in many cases.

Optical fiber interface 102 has a receiver (not shown) for receiving via transmission path 101 the bit string sent from the equipment on the other side, and applying the same to bit synchronizing circuit 103, and a driver (not shown) for driving onto transmission path 101 the bit string to be sent from transmission device 400 to transmission path 101.

Transmission device 400 further includes a control portion 405 which operates in synchronization with clock signal CLK25, receives the control code existing in the character string output from character synchronizing circuit 404 as well as the data output from the equipment via internal interface 113 and the internal state of the equipment, and controls based on them various portions of transmission device 400 and, if necessary, the internal portions of the equipment (via interface 113) for receiving and sending. Transmission device 400 further includes an 8B10B encoder 110 which operates under control of control portion 405 to superimpose the clock information on the original data of 8 bits applied from internal interface 113 into the equipment using the 8B10B encoding method for outputting the code of 10 bits, an FIFO memory 410 which is provided at the output of 8B10B encoder 110 for matching the output timing of data from 8B10B encoder 110 with the timing allowing transmission onto transmission path 101, a packet producing circuit 406 which has a parallel output of 10 bits in width, and is connected to the output of FIFO memory 410 for adding headers 502 and 532 to codes to be sent to the equipment on the opposite side in accordance with the signal received from control portion 405, and thereby producing data packets in accordance with the format shown in FIG. 2, and a parallel-serial converting circuit 407 which receives the output of packet producing circuit 406 and clock signal CLK250, converts the parallel signals formed of character units each formed of 10 bits and sent from packet producing circuit 406 into serial bit strings, and applying the same to optical fiber interface 102.

In the case where control portion 405 controls the timing of output of data from the equipment, FIFO memory 410 may not be required.

Description will now be given on the control of transmission device 400 by control portion 405 during the data receiving and sending. During data reception, control portion 405 determines whether the code sent from character synchronizing circuit 404 matches with any one of the control codes or not. If it matches with any one of the control codes, control portion 405 controls timing of production and sending of the send-control code as well as an internal operation of the equipment in accordance with the matching code. Control portion 405 also determines whether the data packet is being received, or the control packet is being received.

During the sending, control portion 405 determines the contents of the packet to be sent to the equipment on the opposite side as well as the timing of such sending based on the receive-control code, the internal state of the equipment received via internal interface 113, and others. For this purpose, control portion 405 has a function of determining the control code to be sent to the packet producing circuit as well as a function of producing a send-enable signal for instructing the packet producing circuit whether the sending is to be performed or not.

Referring to FIGS. 1 and 2 as well as a timing chart shown in FIG. 3, description will now be given on a manner, in which conventional transmission device 400 performs the ping-pong transmission. First, transmission device 400 operates as follows after it receives the control packet from the equipment on the opposite side and before it sends the control packet to the equipment on the opposite side.

It is now assumed that the equipment on the opposite side sends the control packet in the format shown in FIG. 2(B) to transmission device 400 via transmission path 101. In the equipment on the receiver side, optical fiber interface 102 reads the bit string on transmission path 101, and sends it to bit synchronizing circuit 103. Bit synchronizing circuit 103 synchronizes this bit string with clock signal CLK250 and, after the bit synchronization, applies it as receive-control packet 601 to character synchronizing circuit 404. As is apparent from FIGS. 3(A) and 3(B), this bit-synchronized receive-control packet 601 is not synchronized with internal clock signal (CLK250) 600.

Character synchronizing circuit 404 removes the header from bit-synchronized receive-control packet 601, and outputs the portion (i.e., control code) other than the header as a character-synchronized receive-control code 602 of a 10-bit parallel form synchronized with clock signal CLK25 shown in FIG. 3(A). Character-synchronized receive-control code 602 is applied to control portion 405 and 8B10B decoder 109.

If the received code is different from data start code 504 shown in FIG. 2(A), transmission device 400 operates as follows. If the receive-control code is not data start code 504, data 516 does not follow. For ending the reception and starting the sending operation, control portion 405 immediately outputs a send-enable signal 603 shown in FIG. 3(D) to packet producing circuit 406. At the same time, control portion 405 operates in accordance with the receive-control code, and controls the internal operation of the equipment and/or the operation of the other circuits via internal interface 113, if necessary.

Thereafter, if the control code is to be sent to the equipment on the opposite side, control portion 405 produces send-control code 604 (FIG. 3(E)), and outputs it to packet producing circuit 406 at the next rising edge of internal clock signal (CLK25) 600. When the data is to be sent to the equipment on the opposite side, control portion 405 produces a "data start" code.

When packet producing circuit 406 receives send-enable signal 603 from control portion 405, it immediately produces and outputs a header to parallel-serial converting circuit 407. As can be seen from FIGS. 3(C) and 3(D), control portion 405 sends send-control code 604 to packet producing circuit 406 in the clock cycle immediately after send-enable signal 603. Therefore, packet producing circuit 406 adds send-control code 604 to the end of the header. As a result, a send-control packet 605 shown in FIG. 3(F) is completed as a packet to be sent.

In FIG. 3(F), when send-control code 604 is the "data start" code, packet producing circuit 406 further reads data from FIFO memory 410, and outputs it to parallel-serial converting circuit 407. When FIFO memory 410 becomes empty, packet producing circuit 406 outputs a "data end" code. Accordingly, a send-data packet 606 shown in FIG. 3(G) is obtained as the packet in this stage.

Consequently, the output of the send-control code from packet producing circuit 406 of transmission device 400 is delayed from the appearance of receive-control packet 601 in the receive-control packet after the bit synchronization by a delay time, which is equal to a sum of delay times 611–614.

Although description has been given by way of example on the case of half-duplex transmission, the conventional device has the following structure in the case of the full-duplex transmission. In FIG. 4, parts and portions having functions similar to those shown in FIG. 1 bear the same reference numbers and the same names. Accordingly, description thereof is not repeated.

In the full-duplex transmission, codes are sent on a transmission path without an interruption while transmission is established. Two kinds of codes, which are a control code and a data code, are transmitted similarly to the case of the half-duplex transmission. Before transmitting the data code, DATA_PREFIX code is transmitted. When ending the operation of sending the data code, DATA_END code is sent.

In this example, there is a concept of the data token, and data is sent from a side having the data token. Therefore, the token must be passed between the one side and the other side. This passing of the data token is performed in the following manner.

Referring to FIG. 6, FIG. 6(A) shows a flow of code sent from a sending device, to which the token is to be passed. FIG. 6(B) shows a flow of codes sent from the equipment on the opposite side.

First, the equipment, which is to obtain the token, and will be referred to as a "sender side" hereinafter, sends the control code, which is called a "REQUEST code" to the other or opposite side. As shown in FIG. 6(A), this REQUEST code is repetitively sent until the sender side receives a response from the other side.

The equipment, which receives this REQUEST code, and will be referred to as a "receiver side" hereinafter, sends a control code, which is called a "GRANT" code to the sender side if it accepts the REQUEST code for passing the token to the sender side. This GRANT code is repetitively sent until the receiver side receives a response from the sender side.

When the sender side receives the GRANT code, it starts to send the send-code instead of DATA_PREFIX code to the equipment on the opposite side, and prepares for the data code sending. When the receiver side receives DATA_PREFIX code, it starts to send a control code called "IDLE". The sender side receiving this IDLE determines that the receiver side is now ready to receive the data code, and starts sending of the data.

For receiving the data code, the receiver side must change its receiving mode from that for receiving the control code. FIG. 5 is a flowchart showing the processing performed on the receiver side for the above.

First, the receiving mode is set to the control code receiving mode (S1). After the receiving mode is set to the control code receiving mode, one character is read from the code sent from the sender side (S2). Then, the code expressed by the read character is determined (S3). When it is determined that the code is DATA_PREFIX code, the control returns to step S2, and processing in steps S2 and S3 is repeated.

When it is determined in step S3 that DATA_PREFIX code is received, the control advances to a step S4, and the receiving mode is set to the data code receiving mode. The data code sent from the sender side is read character by character (S5). In subsequent step S6, it is determined whether the code thus read is DATA_END code or not. When it is determined that DATA_END code is received, the control returns to step S1. Otherwise, the control returns to step S5, and the processing in steps S5 and S6 is repeated.

Referring to FIG. 4, a transmission device 700 performing the communication in the full-duplex mode is connected to a sending path 101A, which is a logically one transmission path and is made of an optical fiber, and is also connected to a sending path 101B of the equipment on the opposite side, which is a logically one transmission path and is made of an optical fiber, for performing the communication in the full-duplex mode with respect to the equipment on the opposite side. The other end of sending path 101A is connected to an optical receiver of the equipment on the opposite side, and the other end of sending path 101B of the equipment on the opposite side is connected to the optical transceiver of the equipment on the opposite side. However, sending path 101A and sending path 101B of the opposite equipment may be formed of two optical fibers each forming one of paths 101A and 101B, or may be formed of only one fiber. On sending path 101A, the send-code always flows from transmission device 700 to the opposite equipment, and the send-code always flows on sending path 101b of the opposite equipment from the opposite equipment.

The transmission device 700 has two internal clocks, which are clock signals CLK25 and CLK250, similarly to transmission device 400 shown in FIG. 1.

Transmission device 700 includes an optical receiver 102B connected to transmission path 101B of the opposite equipment, bit synchronizing circuit 103 receiving the output of optical receiver 102B, character synchronizing circuit 404 receiving the output of bit synchronizing circuit 103, 8B10B decoder 109 receiving the output of character synchronizing circuit 404, and internal interface 113 receiving the output of 8B10B decoder 109.

Transmission device 700 further includes a controller 705 which operates in synchronization with clock signal CLK25 to receive the control code existing in the character string sent from character synchronizing circuit 404 as well as the data sent from the inside of the equipment and the internal state of the equipment applied via internal interface 113, and further operates, based on them, to control various portions of transmission device 700 for sending and receiving, if necessary, to control the inside of the equipment via internal interface 113, and to output the selector signal and send-control code to be described later. Transmission device 700 further includes 8B10B encoder 110 which receives the data sent from internal interface 113, encodes the same in the 8B10B encoding method, and outputs the data code in batches of 10-bit parallel character, a code selector 706 which receives the output of 8B10B encoder 110 and the output of control portion 705, and is responsive to the selector signal applied from control portion 705 by selecting one of the outputs of 8B10B encoder 110 and control portion 705, and outputting the same as a 10-bit parallel signal, parallel-serial converting circuit 407 which performs parallel-serial conversion on the output of code selector 706 to output bit strings, and optical transceiver 102A which converts the send-codes output from parallel-serial converting circuit 407 into optical signals, and outputs the same onto sending path 101A.

Transmission device 700 will be described only in connection with differences from transmission device 400. Transmission device 700 operates as follows. For sending and receiving operations, control portion 705 of transmission device 700 has functions, which can be roughly classified into a function of processing the received codes and a function of selecting the send-code.

First, description will be given on the processing of the received code by control portion 70. Control portion 705 switches the receiving mode depending on the code sent from character synchronizing circuit 404. When the receiving mode is the control code receiving mode, control portion 705 reads one character in the output of character synchronizing circuit 404, and decodes it for performing necessary processing. In this case, since the output of 8B10B decoder 109 is of no importance, control portion 705 masks the output of 8B10B decoder 109, and sends to the equipment via internal interface 113 a control signal notifying the internal circuits of the equipment of the fact that the output of 8B10B decoder 109 is invalid. The equipment which received this control signal performs the processing of ignoring the output of 8B10B decoder 109 and other processing.

When it is determined that DATA_PREFIX code is received from the opposite equipment, the receiving mode is set to the data code receiving mode. Thereafter, the codes sent from the opposite side are read character by character. At this time, the output of 8B10B decoder 109 is set valid.

In the sending operation, transmission device 700 operates as follows. Control portion 705 selects the control code to be sent to the opposite equipment in accordance with the control code sent from character synchronizing circuit 404 and the state of transmission device 700. Control portion 705 applies the control code thus selected to code selector 706. Control portion 705 applies to code selector 706 the select signal for indicating whether the output of 8B10B encoder 110 is to be selected or the control code applied from control portion 705 is to be selected.

Code selector 706 selects either the data code applied from 8B10B encoder 110 or the control code applied from control portion 705 in accordance with the value of the select signal applied from control portion 705, and applies it to parallel-serial converting circuit 407.

Parallel-serial converting circuit 407 converts the data code or control code applied from code selector 706 into the bit string, and applies it to optical transceiver 102A, which converts this bit string into the optical signal, and outputs it onto sending path 101A.

According to the fast serial communication, it is desired that the foregoing exchange of control codes is performed as fast as possible. However, any one of the foregoing examples is susceptible to improvement for allowing fast exchange of the control codes. One of the reasons for it is that the control code is excessively long in any case.

Actually, there are only about ten kinds of control codes, and about five bits are enough for the control code. Thus, it is not necessary to allocate 10 bits to the control code similarly to the data code, and there is a possibility that the time required for transmission of the control code can be reduced.

Accordingly, an object of the invention is to provide a transmission device and a method, which can further reduce a length of the control code, and thereby reduce a time required for communication.

Another object of the invention is to provide a transmission device and a method, which can further reduce a length of the control code, and thereby reduce a time required for negotiation.

Still another object of the invention is to provide a transmission device and a method, which can further reduce a length of the control code, and thereby reduce a ping-pong period.

DISCLOSURE OF THE INVENTION

A transmission method of an aspect of the invention is a transmission method for transmitting on a serial transmission path a data code encoded by superimposing a clock signal for decoding on data to be transmitted. The data code thus encoded has bits of a predetermined fixed length. This transmission method uses multiple kinds of control codes to be exchanged on the serial transmission path between a sender side and a receiver side, and each of the multiple kinds of control codes has bits smaller in number than the predetermined fixed length. This transmission method includes the steps of inspecting the received bit string in groups of bits of the number of the control code, and thereby determining whether one of the multiple kinds of control codes is present in the serial signal received on the serial transmission path or not; selecting the control code to be sent based on a result of the determination in the determining step; sending, onto the serial transmission path, the bit string containing at least the control code to be sent based on the result of the determination in the determining step; and receiving the data code by inspecting the received bit string in groups of bits of the fixed length in response to the detection of the control code indicating the start of transmission of the data from the opposite side in the determining step.

According to this transmission method, the data code is inspected in groups of the fixed length of the data code, and the control code is sent and inspected in groups of the bit length shorter than that of the data code. As compared with the case where bits equal to the fixed length of the data code are allocated to the control code, therefore, the sending and inspection of the control codes require a shorter time so that the data can be transmitted fast.

Preferably, the number of bits of the control code is an integral submultiple (e.g., an even submultiple) of the number of bits of the predetermined fixed length, and is equal to one-half of the same in the case where 8B10B encoding method is employed for data encoding.

According to another aspect, the invention provides a transmission device, which is a transmission device for transmitting on a serial transmission path a data code encoded by superimposing a clock signal for decoding on data to be transmitted. The data code thus encoded has bits of a predetermined fixed length. This transmission device uses multiple kinds of control codes to be exchanged on the serial transmission path between a sender side and a receiver side, and each of the multiple kinds of control codes has bits smaller in number than the predetermined fixed length of the data code. This transmission device includes a determining circuit for inspecting the bit string in groups of the small number of bits, and thereby determining whether one of the multiple kinds of control codes is present in the serial signal received on the serial transmission path or not; a sending circuit for determining the control code to be sent based on a result of the determination of the determining circuit, and sending the bit string containing at least the control code to be sent onto the serial transmission path; and a data code receiving circuit for receiving the data code by inspecting the received bit string in groups of bits of the fixed length of the data code in response to the detection by the determining circuit of the control code indicating the start of transmission of the data from the opposite side.

According to this transmission method, the data code is inspected in groups of the fixed length of data code, and the control code is sent and inspected in groups of the bit length shorter than that of the data code. As compared with the case where bits equal to the fixed length of the data code are allocated to the control code, therefore, the sending and inspection of the control codes require a shorter time so that the data can be transmitted fast.

According to still another aspect, the invention provides a transmission device that transmits on a serial transmission path a data code encoded by superimposing a clock signal for decoding on data to be transmitted. The data code thus encoded has bits of a predetermined fixed length. This transmission device uses multiple kinds of control codes to be exchanged on the serial transmission path between a sender side and a receiver side, and each of the multiple kinds of control codes has bits of a number smaller than the predetermined fixed length of the data code. This transmission device includes a first synchronizing circuit for converting a serial signal received on the serial transmission path into a parallel signal of bits equal in number to that of the control code and synchronized with a clock signal for processing the control code with the number of bits of the control code, a control circuit for determining, in synchronization with the clock signal for processing the control code, whether the parallel signal output from the first synchronizing circuit contains any one of the plurality of control codes or not, and controlling the transmission device in accordance with a result of the determination, and a pack circuit for packing a plurality of characters expressed by the parallel signals output from the first synchronizing circuit into one character of the parallel signal of bits of the fixed length.

According to this transmission method, the data code is inspected in groups of the fixed length of data code, and the control code is sent and inspected at a rate of the bit length shorter than that of the data code. As compared with the case where bits equal to the fixed length of the data code are allocated to the control code, therefore, the sending and inspection of the control codes require a shorter time so that the data can be transmitted fast.

BRIEF DESCRIPTION OF THE DRAWINGS

FIG. 10 is a timing chart of received code determination processing performed by the transmission device of the first embodiment;

FIG. 11 shows, in a table format, comparison of a ping-pong reaction delay time between the transmission device of the first embodiment and the conventional transmission device;

BEST MODES FOR CARRYING OUT THE INVENTION

Preferred embodiments for implementing the invention will now be described. In the following description and the previous description of the prior art, which is already given, parts having the same or similar functions bear the same reference numbers and the same names. Accordingly, description of them is not repeated unless it is necessary.

First Embodiment

Figure 1:
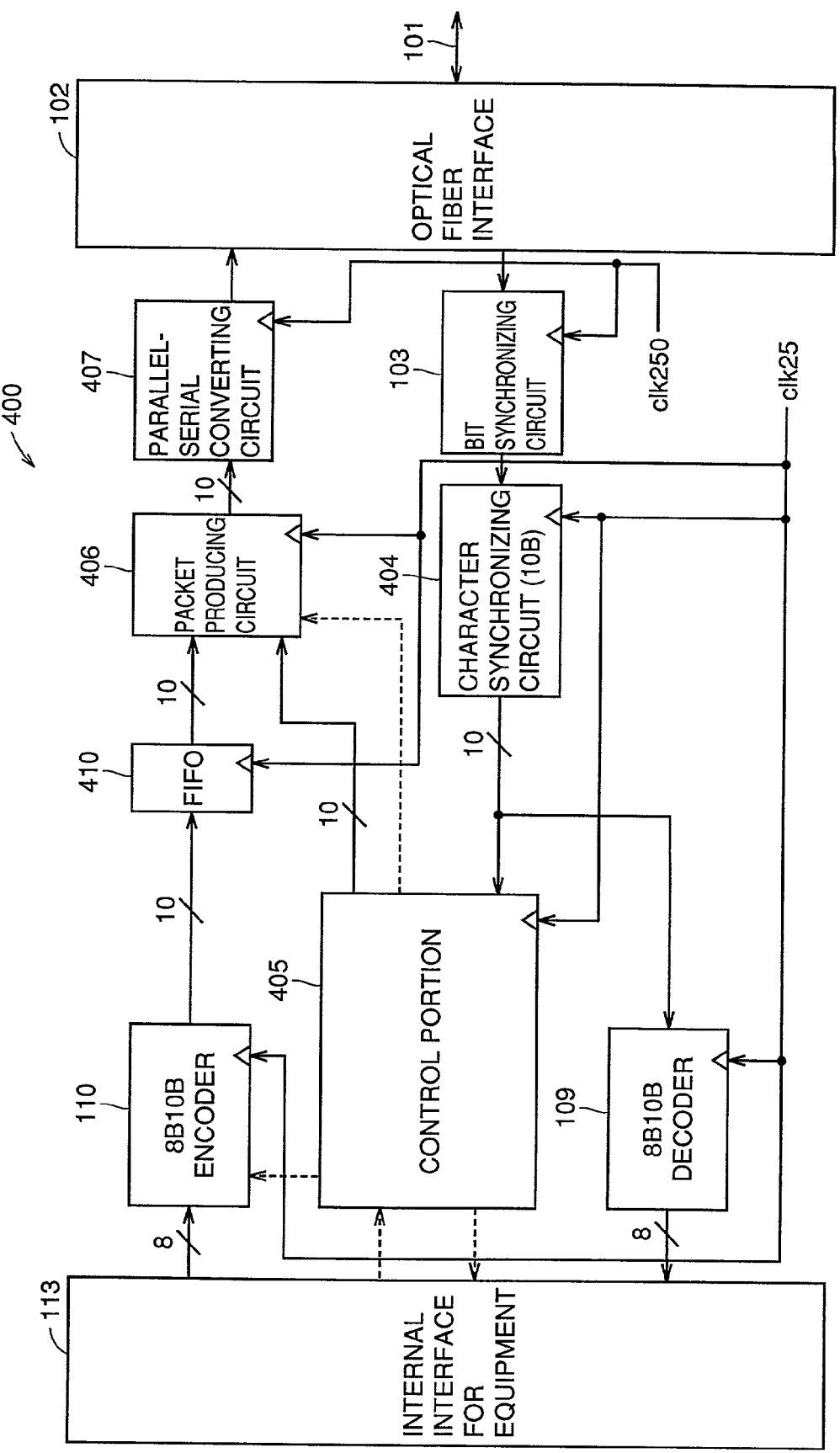
FIG. 1 is a block diagram of a first embodiment of a conventional device.
Figure 7:
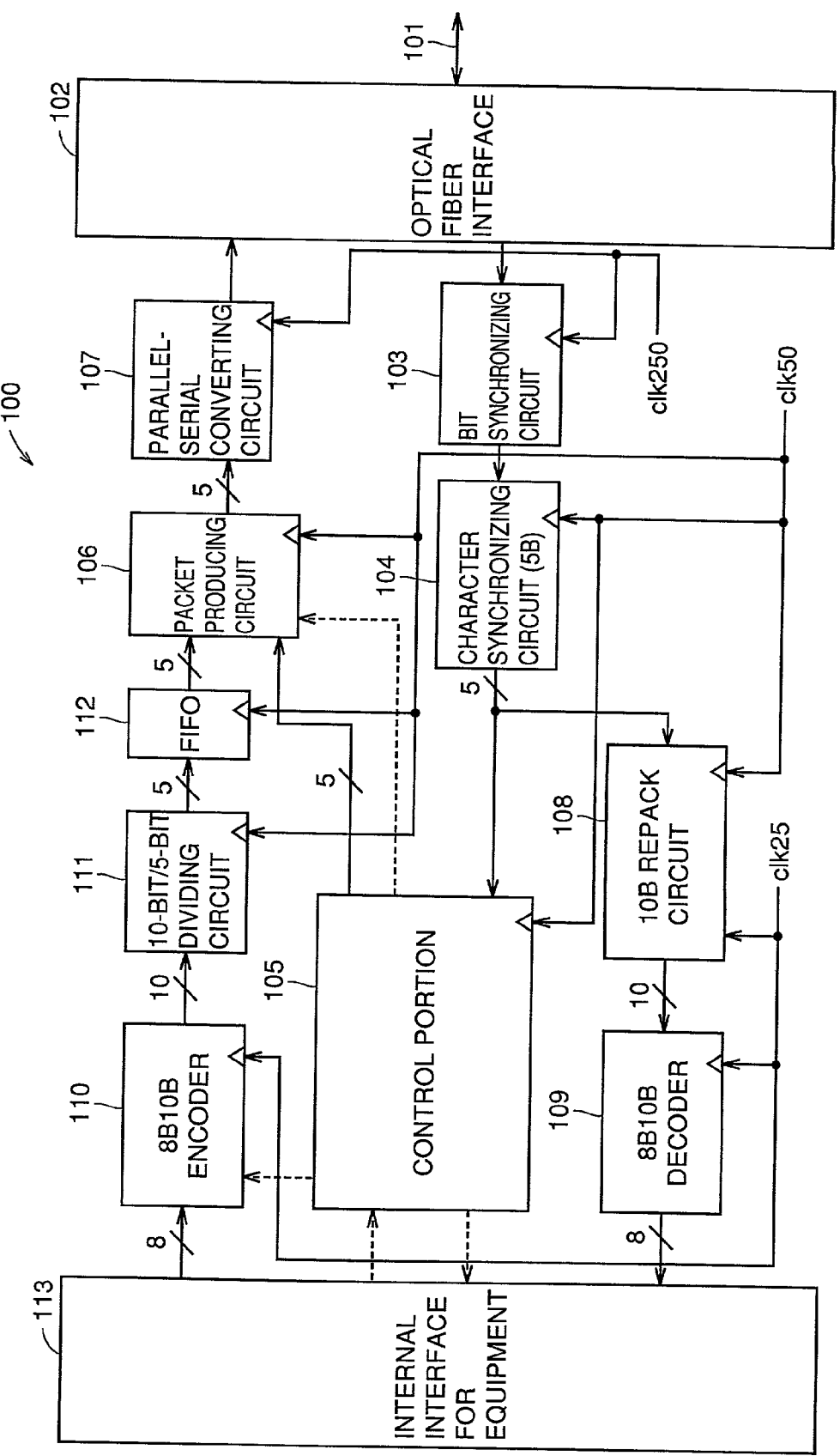
FIG. 7 is a block diagram of the transmission device according to a first embodiment of the invention.

Referring to FIG. 7, a transmission device 100 according to the first embodiment of the invention is a device for performing communication with the opposite equipment via a transmission path 101 in a half-duplex mode. Similarly to transmission device 400 shown in FIG. 1, transmission device 100 has clock signals CLK25 and CLK250, and additionally has a clock signal CLK50 having half the cyclic period (i.e., double the frequency) of clock signal CLK25. Clock signal CLK50 is employed for handling the control code within transmission device 100 in groups of 5 bits, which are equal to a half of 10 bits.

Transmission device 100 includes: optical fiber interface 102 connected to transmission path 101, bit synchronizing circuit 103 which receives the output of optical fiber interface 102, and operates with clock signal CLK250; a character synchronizing circuit 104 (5 bits) which receives the output of bit synchronizing circuit 103, converts the bit string output from bit synchronizing circuit 103 and synchronized with clock signal CLK250 into parallel signals 5 bits a time, and outputs them in synchronization with clock signal CLK50; a 10B repack circuit 108 for receiving the output of character synchronizing circuit 104 and clock signals CLK25 and CLK50, reconstructing in synchronization with clock signal CLK50 the characters, which are output in parallel from character synchronizing circuit 104 in groups of 5 bits, each formed of 5 bits, into characters each formed of 10 bits, and outputting the same as a 10-bit parallel signal in synchronization with clock signal CLK25; an 8B10B decoder 109 receiving the output of 10B repack circuit 108; and an interface 113 provided for the inside of the equipment for receiving the output of 8B10B decoder 109.

Transmission device 100 further includes: a control portion 105 which operates in synchronization with clock signal CLK50, receives the control code existing in the character string output from character synchronizing circuit 104 as well as the data output from the equipment via internal interface 113 and the internal state of the equipment, operates based on them to control the various portions of transmission device 100 for receiving and sending as well as, if necessary, the internal circuits of the equipment via internal interface 113, and outputs the send-control code of 5 bits and the send-enable signal controlling the sending; an 8B10 encoder 110 receiving the output of internal interface 113; a 10-bit/5-bit dividing circuit 111 receiving the output of 8B10B encoder 110, operating in synchronization with clock signal CLK50, dividing 10-bit parallel data, which is output from 8B10B encoder 110 in synchronization with clock signal CLK25, into pieces each formed of 5 bits, and outputting the same as parallel signals in synchronization with clock signal CLK50; an FIFO memory 112 which receives the output of 10-bit/5-bit dividing circuit 111, operating in synchronization with clock signal CLK50 and having an output of a 5-bit width; a packet producing circuit 106 which receives the output of data code of FIFO memory 112 and the output of control code sent from control portion 105, produces a packet from the output of FIFO memory 112 and the control code sent from control portion 105 in response to the send-enable signal applied from control portion 105, and outputs the same in synchronization with clock signal CLK50; and a parallel-serial converting circuit 107 which receives the parallel signal of 5 bits sent from packet producing circuit 106, converts it into the bit string in synchronization with clock signal CLK250, and outputs the same. The bit string sent from parallel-serial converting circuit 107 is converted into an optical signal by optical fiber interface 102, and is output onto transmission path 101.

Figure 8:
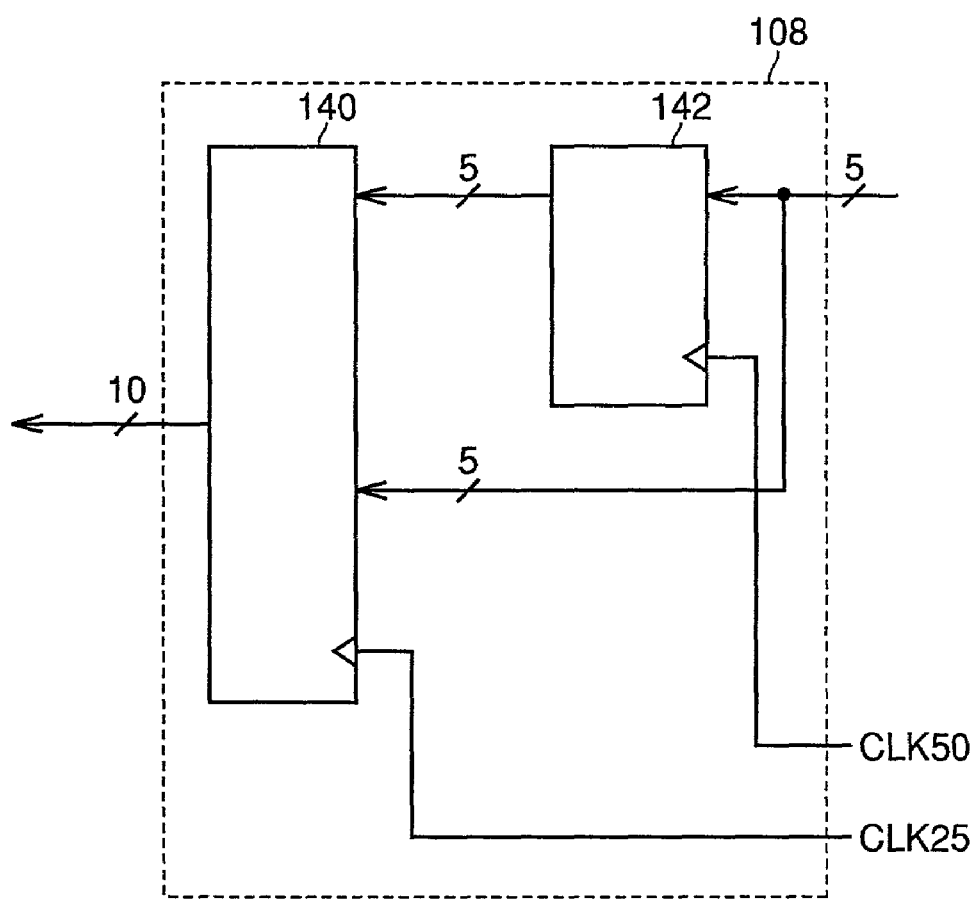
FIG. 8 is a block diagram of a 10-bit repack circuit.

Referring to FIG. 8, 10B repack circuit 108 includes a 5-bit latch circuit 142 which receives a character signal of 5 bits applied from character synchronizing circuit 104 for holding and outputting it in synchronization with clock signal CLK50, and a 10-bit latch circuit 140 which has an input connected to 5 bits forming the output of character synchronizing circuit 104, and operates in synchronization with clock signal CLK25 to hold and output the input signal as a 10-bit parallel signal to 8B10B decoder 109.

Figure 2:
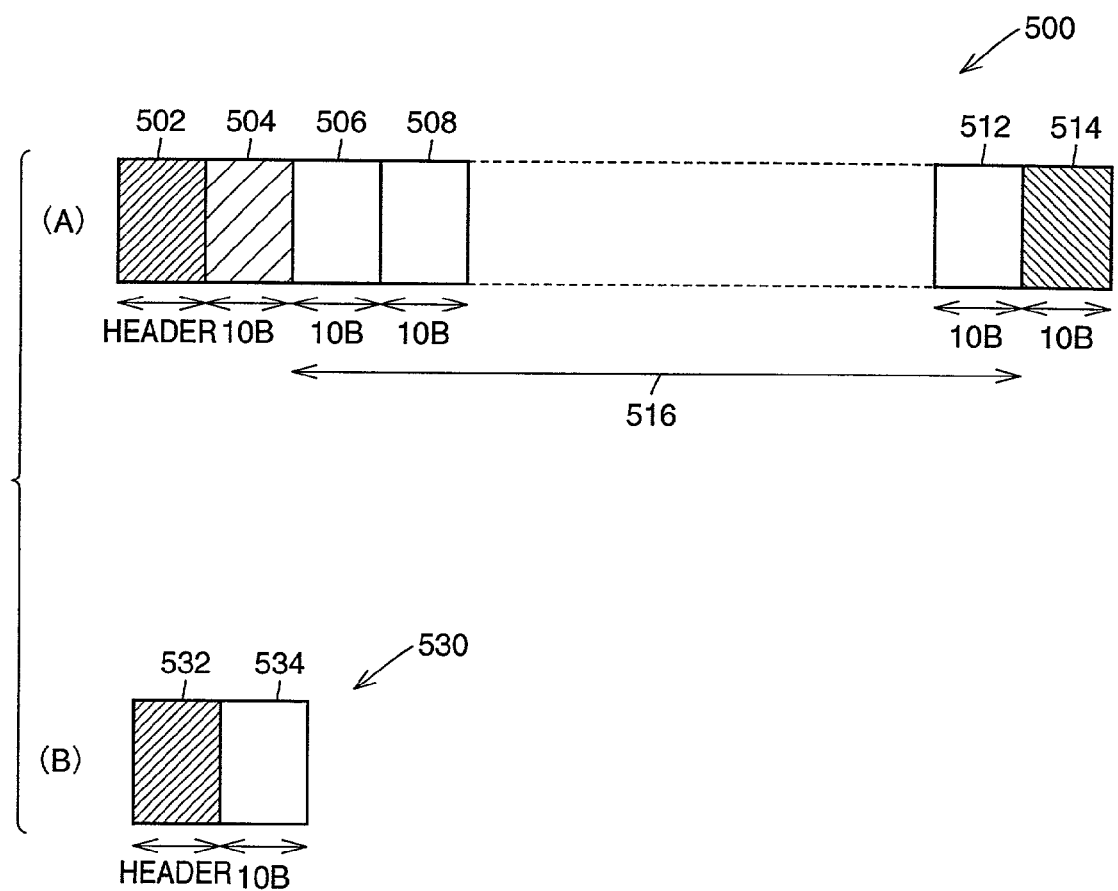
FIG. 2 shows a format of a packet used in the device shown in FIG. 1.
Figure 9:
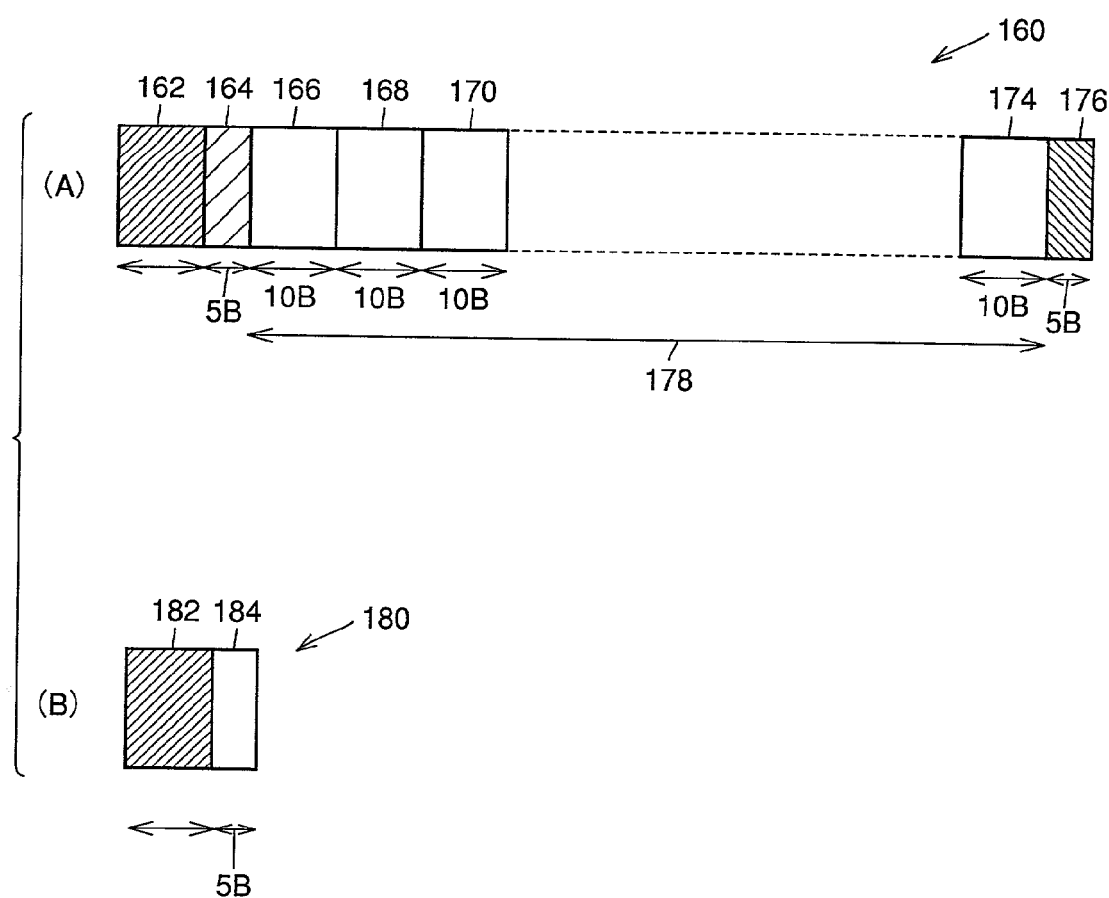
FIG. 9 shows a format of a packet used in communication by the transmission device of the first embodiment.

FIG. 9 shows a format of the packet used in transmission device 100 of the first embodiment. Referring to FIG. 9(A), a data code packet 160 includes a header 162, a data start code 164 of 5 bits, data 178 and a data end code 176 of 5 bits added to the end of data 178. Header 162 is the same as header 502 shown in FIG. 2. Data 178 includes data codes 166, 168, . . . and 174, which are encoded in the 8B10B encoding method, and each has a character of 10 bits.

Referring to FIG. 9(B), control code packet 180 includes a header 182 and a control code 184 of 5 bits.

As can be seen from FIG. 9, transmission device 100 uses five bits as a control code in contrast to the data code of 10 bits. Since the codes must be handled 5 bits a time, clock signal CLK50 having half the cycle period (double the frequency) of clock signal CLK25 is introduced in addition to clock signal CLK25 used for handling codes 10 bits a time.

Transmission device 100 of the first embodiment has a distinctive feature relating to the operation after receiving the control code packet and before sending the control code packet or data code packet. This will be described below.

Referring to FIG. 10(B), a receive-control code 202 in the packet, which is subjected to the bit synchronization by bit synchronizing circuit 103, is sent together with the header to character synchronizing circuit 104. In this operation, the bit string forming the packet is not synchronized with a clock signal 200 (CLK50) for the 5-bit code shown in FIG. 10(A).

Referring to FIG. 10(C), character synchronizing circuit 104 removes the header from the packet, and a control code 204 of 5 bits is output to control portion 105 and 10B repack circuit 108. Control code 204 is a 5-bit code, and therefore is synchronized with clock signal 200 (CLK50).

If the received code is not data start code 164 shown in FIG. 9(A), transmission device 100 operates as follows. If the receive-control code of five bits is not data start code 164, data 178 does not follow it. For ending the receiving operation and starting the sending operation, control portion 105 immediately outputs a send-enable signal 206 shown in FIG. 10(D) to packet producing circuit 106. At the same time, control portion 105 controls internal circuits of the equipment via internal interface 113, and/or controls other circuits, if necessary, depending on the receive-control code.

When the control code is to be sent thereafter to the opposite equipment, control portion 105 produces a send-control signal 208 (FIG. 10(E)) of 5 bits, and outputs it to packet producing circuit 106 at the next rising edge of clock signal 200 (CLK50) for 5-bit code. When the data is to be sent to the opposite equipment, control portion 105 produces a "data start" code of five bits.

Upon reception of send-enable signal 206 from control portion 105, packet producing circuit 106 issues the header to parallel-serial converting circuit 107. As can be seen from FIGS. 10(C) and 10(D), control portion 105 sends send-control signal 208 of 5 bits to packet producing circuit 106 in a clock cycle of clock signal 200 (CLK50) for the 5-bit code immediately after send-enable signal 206. Therefore, packet producing circuit 106 adds this send-control signal 208 of 5 bits to the end of header. Consequently, a send-control packet 210 shown in FIG. 10(F) is prepared as the packet to be sent.

In FIG. 10(E), when send-control code 604 is the "data start" code, packet producing circuit 106 further reads data from FIFO memory 112 in groups of 5 bits, and converts the same into the bit string for sending it to parallel-serial converting circuit 107. When FIFO memory 112 becomes empty, packet producing circuit 106 outputs a "data end" code of five bits. As a result, a send-data packet 212 shown in FIG. 10(G) is present in this state.

Consequently, the delay time, which is present after receive-control code 202 appears in the receive-control packet subsequently to bit synchronization and before packet producing circuit 106 of transmission device 100 outputs the send-control code of 5 bits, is equal to the sum of a delay time 220 from the output of receive-control code 202 to the start of output of send-enabled signal 206, a delay time 222 from the start of output of send-enable signal 206 to the start of output of header, a delay time 224 required for output of the header and a delay time 226 required for output of the control code of 5 bits.

Figure 3:
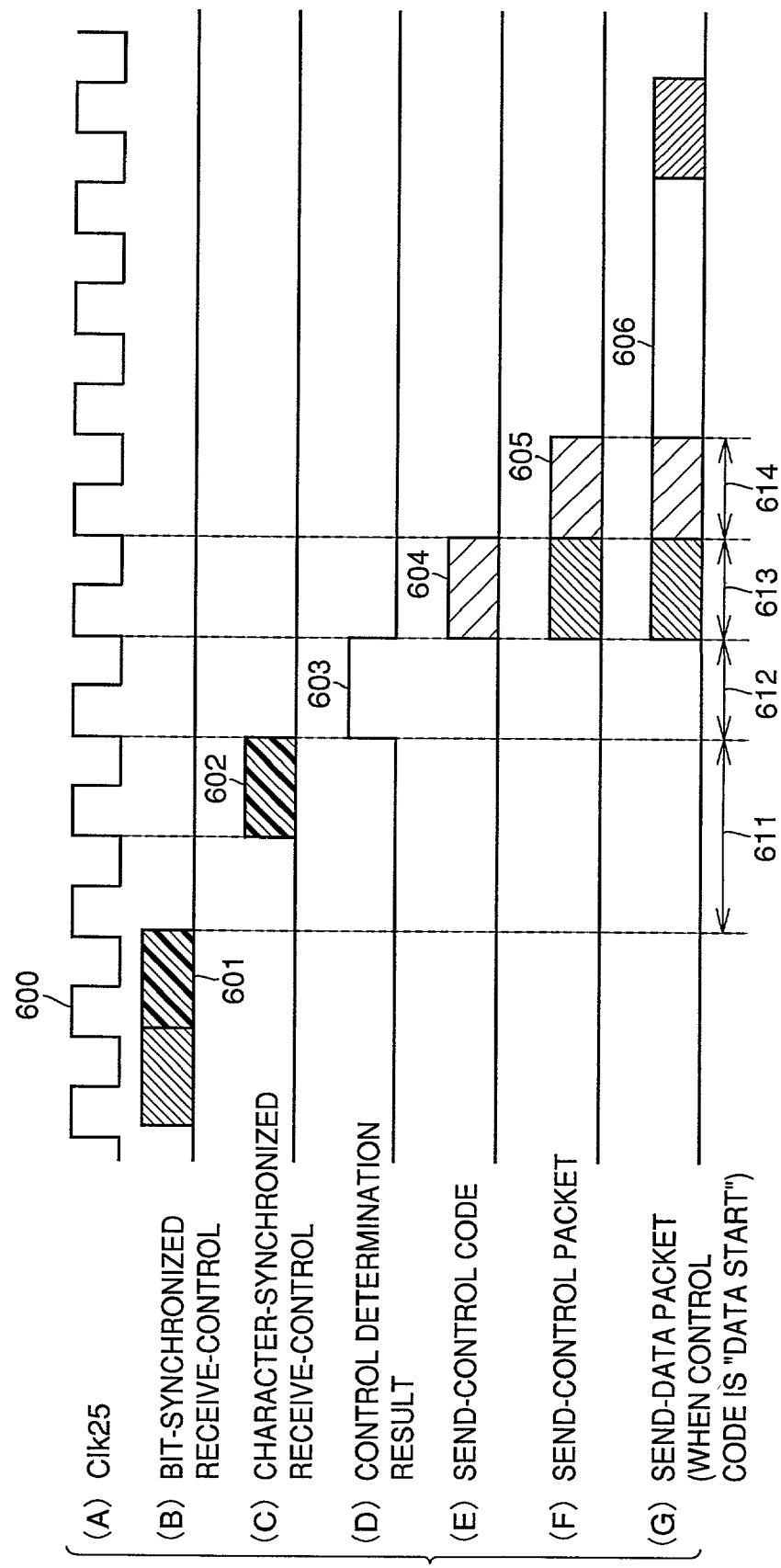
FIG. 3 is a timing chart of received code determination processing performed in the conventional device shown in FIG. 1.

As can be seen from comparison of a timing chart of FIG. 10 with FIG. 3, the flow itself of the processing by transmission device 100 of the first embodiment is completely the same as that of transmission device 400. However, delay times 220, 222 and 226 in FIG. 10 are shorter than delay times 611, 612 and 614 shown in FIG. 3, respectively. This is because the control code is reduced from 10 bits to five bits, and therefore the time required for transmission of the control code causes the delay to a smaller extent. Another reason is that the period of clock signal 200 (CLK50) for the 5-bit code is half the period of internal clock signal (CLK25) 600 in FIG. 3, and therefore delay time 222 is shorter than conventional delay time 612.

FIG. 11 shows, in a table format, ping-pong delay times of the conventional example in FIG. 3 and the example of the first embodiment in FIG. 10 for comparison. This evaluation is based on assumption that an ideal state is achieved so that the bit synchronization can be started from the first bit of the received code, and each processing is completed during one clock.

Referring to FIG. 11, this first embodiment can achieve the time reducing effects in three operations "character synchronization", "control code addition" and "control code determination". Among them, the time reduction in "character synchronization" and "control code addition" is achieved directly from the fact that the device uses the control code of bits shorter than 10 bits, which are the shortest length of the data code in the 8B10B encoding mode. The time reduction in "control code addition" is a secondary effect achieved by increasing the frequency of the internal clock.

Second Embodiment

Figure 4:
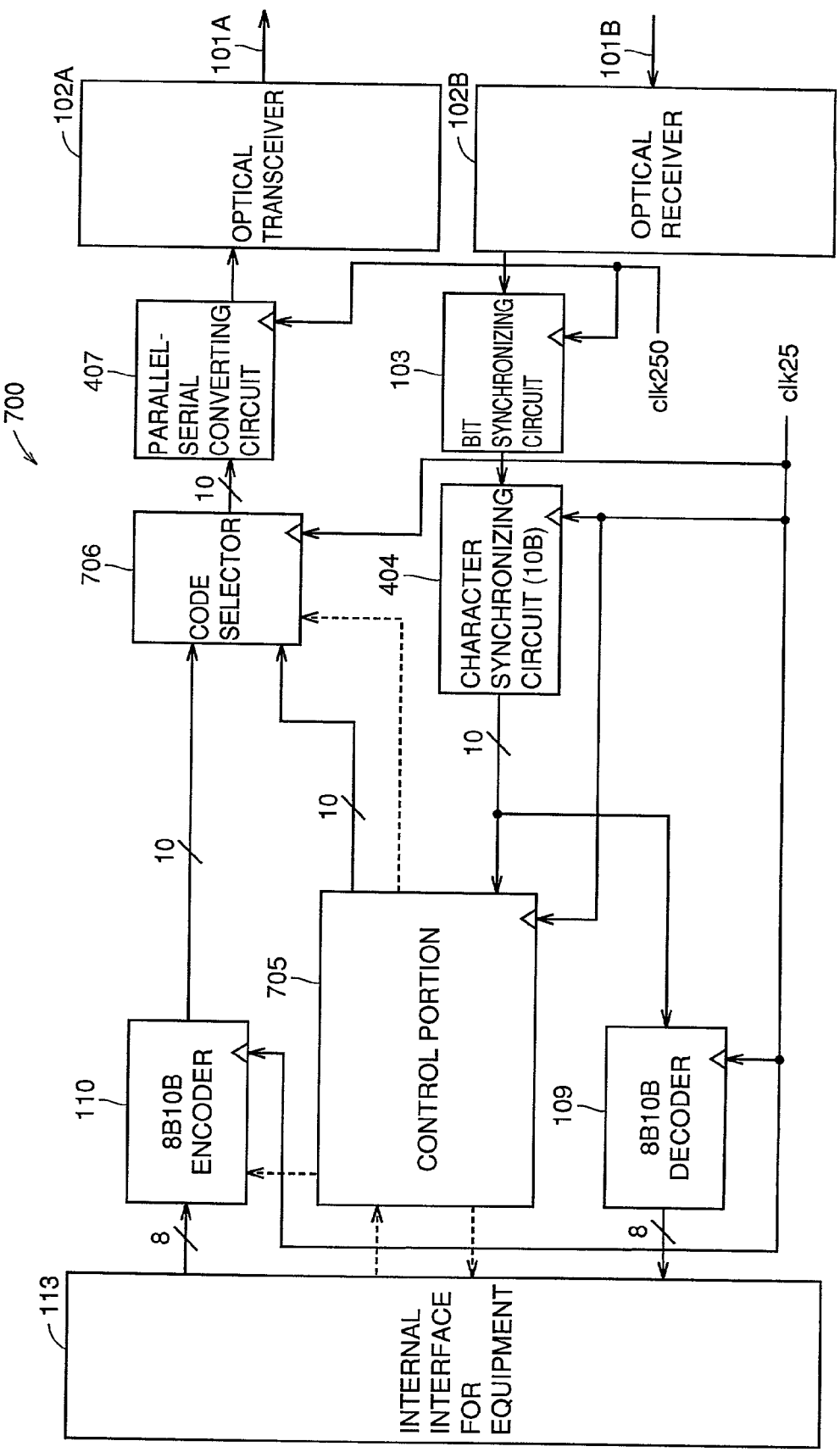
FIG. 4 is a block diagram of a second example of the conventional device.
Figure 5:
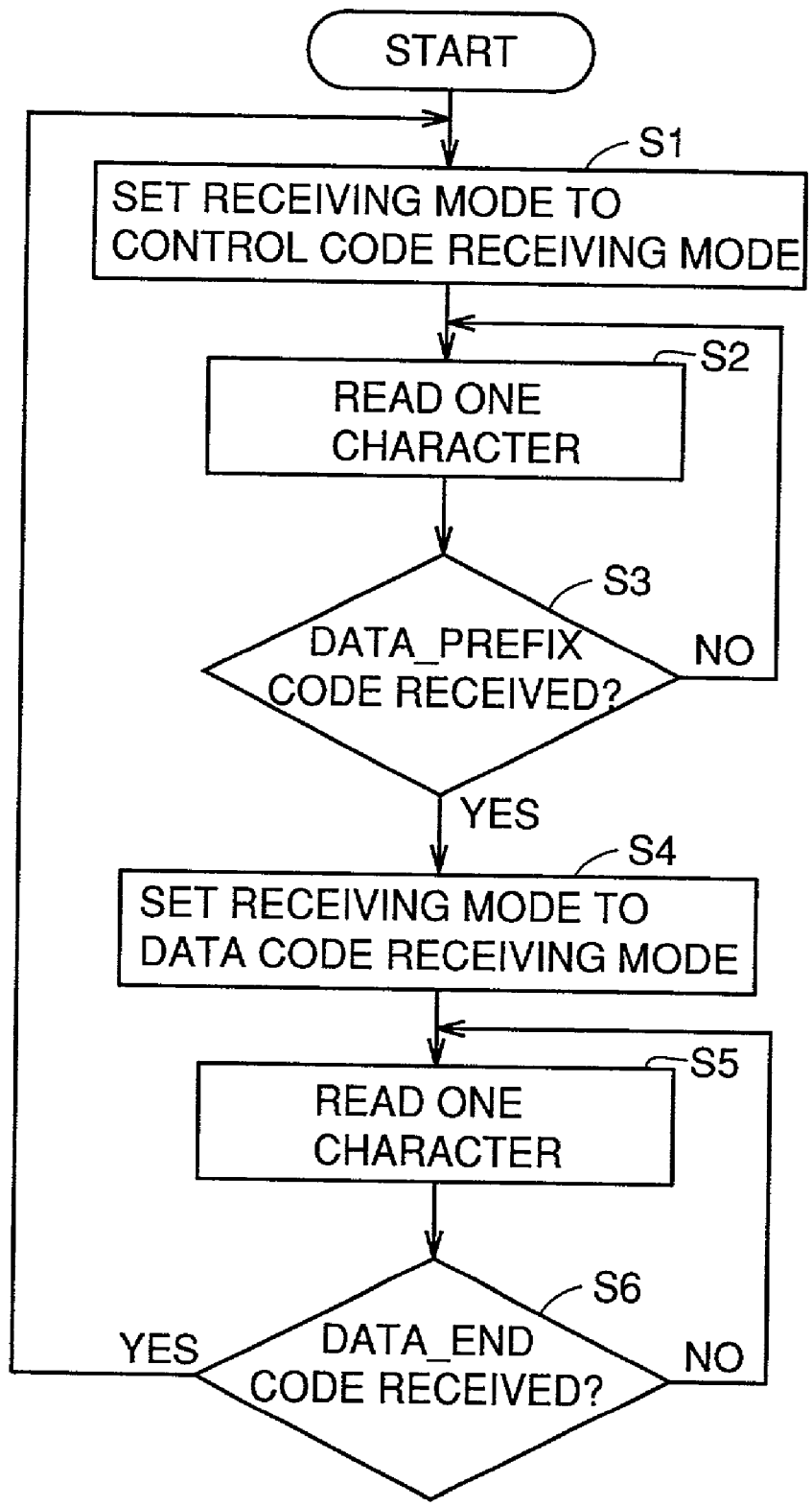
FIG. 5 is a flowchart of processing executed by the device shown in FIG. 4.
Figure 12:
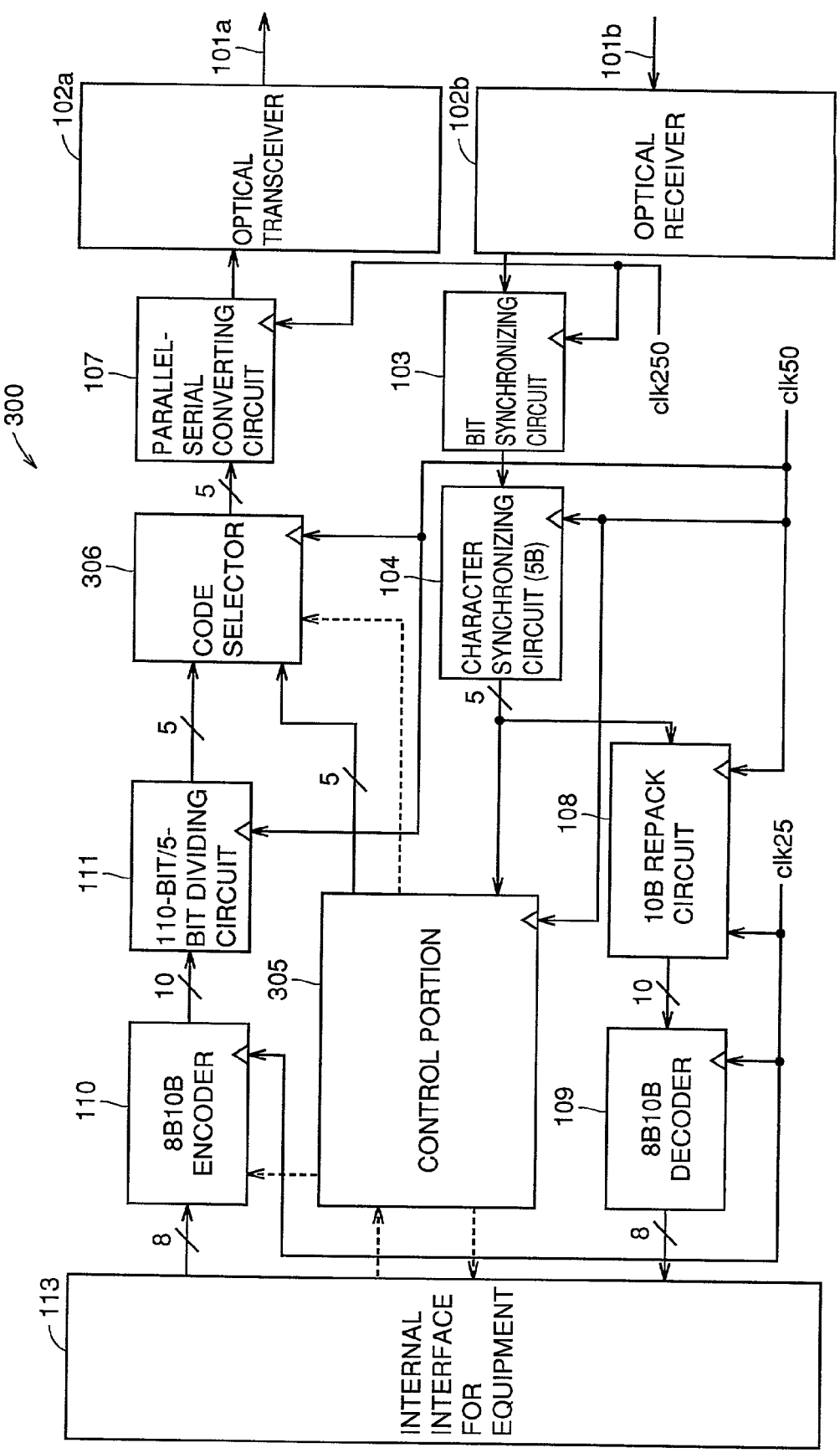
FIG. 12 is a block diagram of a transmission device of a second embodiment of the invention.

An embodiment, in which the invention is applied to the full-duplex transmission system (corresponding to the conventional example in FIG. 4), will now be described with reference to FIG. 12. Similarly to the first embodiment, a transmission device 300 of the second embodiment uses clock signals CLK25 and CLK250, and further uses clock signal CLK50 as an internal clock signal for handling data of 5 bits.

Transmission device 300 includes optical receiver 102B connected to a sending path 101B of the opposite equipment, bit synchronizing circuit 103 which receives the output of optical fiber interface 102, and operates with clock signal CLK250, character synchronizing circuit 104 which receives the output of bit synchronizing circuit 103, and operates with clock signal CLK50, 10B repack circuit 108 which receives the output of character synchronizing circuit 104, and operates with clock signals CLK25 and CLK50, 8B10B decoder 109 which receives the output of 10B repack circuit 108, and internal interface 113 which receives the output of 8B10B decoder 109.

Transmission device 300 further includes a control portion 305 which operates in synchronization with clock signal CLK50, receives the control code existing in the character string sent from character synchronizing circuit 104, also receives through internal interface 113 the data externally output from the equipment as well as the internal state of the equipment, operates based on them to control various portions of transmission device 300 for sending and receiving and, if necessary, controls internal circuits of the equipment through internal interface 113, and outputs the send-control code of 5 bits and the selector signal for controlling the production of packets. Transmission device 300 further includes: 8B10B encoder 110 which receives data of 8 bits from internal interface 113, and encodes it in the 8B10B encoding method for outputting the data code of 10 bits; 10-bit/5-bit dividing circuit 111 receiving the output of 8B10B encoder 110, and dividing it into pieces each formed of 5 bits for successively outputting them in synchronization with clock signal CLK50; a code selector 306 which receives the output of 10-bit/5-bit dividing circuit 111 and the control code of 5 bits applied from control portion 305, and selects one of them for output it in response to the selector signal applied from control portion 305; parallel-serial converting circuit 107 which operates in synchronization with clock signal CLK250 to convert the parallel data of 5 bits output from code selector 306 into the bit strings; and optical transceiver 102A which converts the bit string output from parallel-serial converting circuit 107 into the optical signal, and outputs the same onto sending path 101A.

Figure 6:
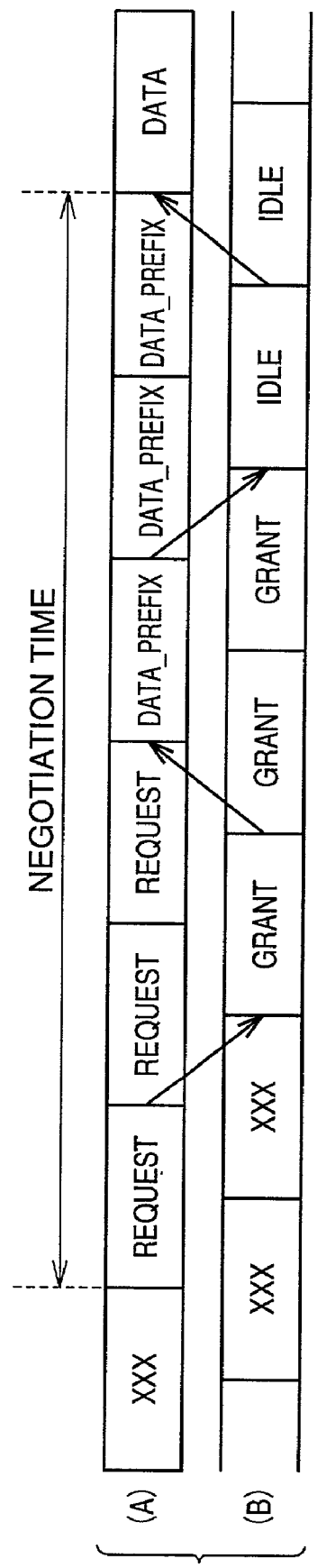
FIG. 6 shows a negotiation time of the device shown in FIG. 4.
Figure 13:
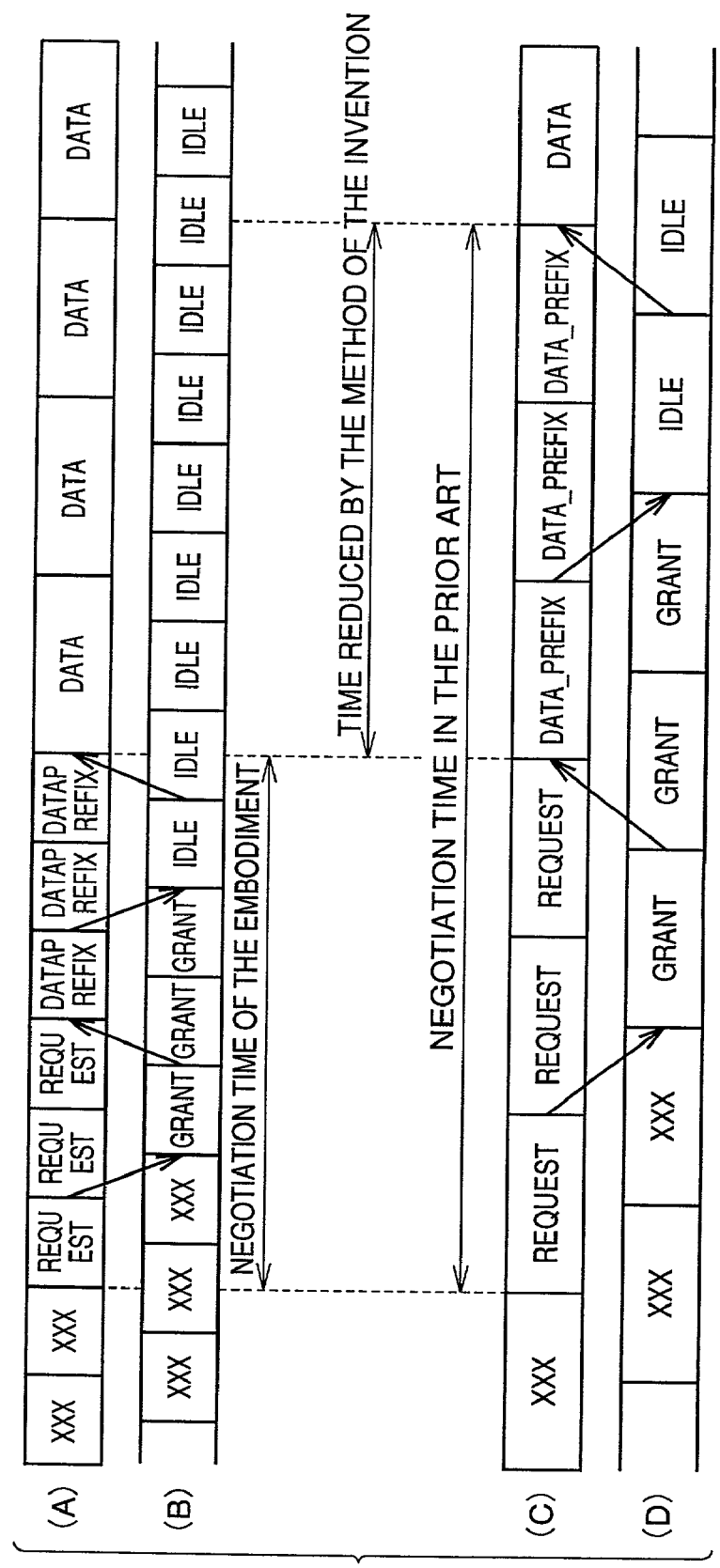
FIG. 13 shows comparison of a negotiation time between the device of the second embodiment and the conventional transmission device.

Transmitting device 300 according to the second embodiment has a distinctive feature in the operation during negotiation of the data token. The operation of transmission device 300 during negotiation of the data token will now be described with reference to FIG. 12 as well as in FIGS. 13(A) and (B). FIGS. 13(C) and (D) show a negotiation process in a conventional device for comparison, and show the same contents as FIGS. 6(A) and (B), respectively. In this example, both the receiver and sender sides, which once send the control code, continue to send the same control code until receiving any response from the other sides, respectively.

Referring to FIG. 12(A), the sender side sends REQUEST code of five bits to the receiver side when the token is to be passed to the sender side. When the receiver side receives the REQUEST code, and the token can be passed to the sender side, the receiver side sends the GRANT code. When the receiver side receives this GRANT code, it sends DATA_PREFIX code. The receiver side receives DATA_PREFIX code, and sends IDLE code if the receiver side is ready for receiving. Upon reception of IDLE code, the sender side starts sending of the data.

In FIGS. 13(A) and (B), the time required for sending each control code is half the time required in FIGS. 13(C) and (D). Thus, the second embodiment can significantly reduce the time required for negotiation at the time of passing of the token, and therefore the time required for transmission of the data can be reduced.

INDUSTRIAL APPLICABILITY

According to the invention, as described above, the serial data transfer can be performed fast in either of the full-duplex mode and the half-duplex mode. Therefore, the invention is suitable for fast serial data transfer between two sides using digital technologies such as home electric devices, computers, peripheral devices of computers, digital cameras and digital video cameras.

What is claimed is:

1. A transmission method for transmitting on a serial transmission path a data code encoded by superimposing a clock signal for decoding on data to be transmitted,
    the encoded data code of a first bit length having a predetermined number of bits,
    said transmission method using a plurality of control codes to be exchanged on said serial transmission path between a sender side and a receiver side, each of said plurality of control codes is of a second bit length having a smaller number of bits than said first bit length, and said transmission method comprising the steps of:
    inspecting a bit string in groups of bits of said second bit length in order to determine whether one of said plurality of control codes is present in a serial signal received from said serial transmission path or not;
    selecting a second control code to be sent to said serial transmission path based on a determination in said inspecting step that a first control code is present;
    sending, onto said serial transmission path, a bit string containing at least said second control code to be sent based on the result of the determination in said inspecting step; and
    receiving the data code by inspecting said bit string in groups of bits of said first bit length in response to the determination that the first control code received from the opposite side in said determining step indicates the start of transmission of the data.

2. The transmission method according to claim 1, wherein the number of bits of each said plurality of control codes is an integral submultiple of the number of bits of said predetermined first bit length.

3. The transmission method according to claim 2, wherein the number of bits of said predetermined first bit length is even, and
    the number of bits of said plurality of control codes is an even submultiple of the number of bits of said predetermined first bit length.

4. The transmission method according to claim 3, wherein the bits of said first bit length are ten in number, and
    the bits of said plurality of control codes are five in number.

5. The transmission method according to claim 1, wherein said transmission path is a half-duplex transmission path,
    said transmission method is configured to achieve bidirectional communication by switching the direction of communication by exchange of the first and second control codes,
    said selecting step includes the step of selecting the sending of said second control code in response to the determination of the existence of said first control code in said inspecting step,
    said transmission method further comprises the step of producing said second control code in response to the selection of sending of said second control code in said selecting step, and
    said sending step includes the steps of:
    sending said second control code onto said transmission path subsequently to a predetermined header,
    sending said encoded data code subsequently to said second control code, and
    sending said first control code after end of the sending of said encoded data code.

6. The transmission method according to claim 1, wherein said transmission path is a full-duplex transmission path,
    said transmission method is configured to pass a token by switching the direction of communication by exchange of the first and second control codes,
    said transmission method further comprises the step of starting transmission of said first control code onto said transmission path for acquiring the token,
    said inspecting step includes the step of determining whether the opposite side sends said second control code in response to said first control code or not,
    said selecting step includes the step of sending a third control code indicating sending of data in response to the existence of the second control code determined in said inspecting step, and
    said transmitting method further comprises the steps of:
    determining whether said opposite side sends a fourth control code in response to said third control code or not, and
    starting sending of the encoded data code in response to determination of sending of said fourth control code.

7. A transmission device for transmitting on a serial transmission path a data code encoded by superimposing a clock signal for decoding on data to be transmitted,
    said encoded data code of a first bit length having a predetermined number of bits,
    said transmission device using a plurality of control codes to be exchanged on said serial transmission path between a sender side and a receiver side, each of said plurality of control codes is of a second bit length having a smaller number of bits than said predetermined first bit length, and said transmission device comprising:
    determining means for inspecting a bit string in groups of bits of said second bit length in order to determine whether one of said plurality of control codes is present in a serial signal received from said serial transmission path or not;
    sending means for selecting a second control code to be sent to said serial transmission path based on determination in said determining means, and sending a bit string containing at least said second control code to be sent onto said serial transmission path; and
    data code receiving means for receiving the data code by inspecting said bit string in groups of bits of said first bit length in response to the determination by said determining means that the first control code received from the opposite side indicates the start of transmission of the data.

8. The transmission device according to claim 7, wherein the number of bits of each said plurality of control codes is an integral submultiple of the number of bits of said predetermined first bit length.

9. The transmission device according to claim 8, wherein the number of bits of said predetermined first bit length is even, and
    the number of bits of each said plurality of control codes is an even submultiple of the number of bits of said predetermined first bit length.

10. The transmission device according to claim 9, wherein
the bits of said first bit length are ten in number, and
the bits of each said plurality of control codes are five in number.

11. The transmission device according to claim 7, wherein
said transmission path is a half-duplex transmission path,
said transmission device is configured to achieve bidirectional communication by switching the direction of communication by exchange of the first and second control codes, and
said sending means includes:
means for sending on said transmission path said second control code subsequently to a predetermined header in response to determination of the existence of said first control code by said determining means,
means for sending said encoded data code onto said transmission path subsequently to said second control code, and
means for sending said first control code after the end of sending of said encoded data code.

12. The transmission device according to claim 7, wherein
said transmission path is a full-duplex transmission path,
said transmission device is configured to pass a token by switching the direction of communication by exchange of the first and second control codes,
said transmission device further comprises means for starting transmission of said first control code onto said transmission path for acquiring the token,
said determining means includes the means for determining whether the opposite side sends said second control code in response to said first control code or not,
said sending means includes means for sending a third control code indicating sending of data in response to the fact that existence of said second control code is determined by said determining means, and
said transmitting device further comprises:
means for determining whether said opposite side sends a fourth control code in response to said third control code or not, and
means for sending the data code encoded by said encoding method in response to determination of sending of said fourth control code.

13. A transmission device for transmitting on a serial transmission path a data code encoded by superimposing a clock signal for decoding on data to be transmitted,
said encoded data code of a first bit length having a predetermined number of bits,
said transmission device using a plurality of control codes to be exchanged on said serial transmission path between a sender side and a receiver side, each of said plurality of control codes is of a second bit length having a smaller number of bits than said predetermined first bit length, and said transmission device comprising:
a first synchronizing circuit for converting a serial signal received from said serial transmission path into a parallel signal of bits of the number equal to said second bit length and synchronized with a clock signal for processing the control code one of said plurality of control codes with the number of bits of said second bit length,
a control circuit for determining, in synchronization with the clock signal, whether said parallel signal output from said first synchronizing circuit contains any one of said plurality of control codes or not, and controlling said transmission device in accordance with a result of the determination, and
a pack circuit for packing a plurality of characters expressed by said parallel signals output from said first synchronizing circuit into one character of the parallel signal of bits of said first bit length.

14. The transmission device according to claim 13, further comprising:
an encoding circuit for encoding the data to be sent into the character expressed by the parallel signal of bits of the first bit length in accordance with said encoding method,
a dividing circuit for dividing each character output from said encoding circuit into a plurality of characters expressed by the parallel signal of the number of bits of said second bit length,
said control circuit outputting a second control code to be sent to the opposite side in accordance with the result of the determination that the one of the plurality of control codes is received, and
a sending circuit for selecting the second control code output from said control circuit and the output of said dividing circuit, and sending the same onto said transmission path.

15. The transmission device according to claim 13, wherein
the number of bits of each said plurality of control codes is an integral submultiple of the number of bits of said predetermined first bit length.

16. The transmission device according to claim 15, wherein
the number of bits of said predetermined first bit length is even, and
the number of bits of each said plurality of control codes is an even submultiple of the number of bits of said predetermined first bit length.

17. The transmission device according to claim 16, wherein
the bits of said first bit length are ten in number, and
the bits of each said plurality of control codes are five in number.

* * * * *